(12) United States Patent
John et al.

(10) Patent No.: US 10,087,780 B2
(45) Date of Patent: Oct. 2, 2018

(54) TURBOCHARGER LUBRICANT TURBINE

(71) Applicant: Honeywell International Inc., Morristown, NJ (US)

(72) Inventors: Poomkuzhimannil Zachariah John, Bangalore (IN); Suryakant Gupta, Benares (IN); Parikshit I Mulani, Pune (IN); Maltesh Kolur, Bangalore (IN); Giorgio Figura, Epinal (FR)

(73) Assignee: Honeywell International Inc., Morris Plains, NJ (US)

( * ) Notice: Subject to any disclaimer, the term of this patent is extended or adjusted under 35 U.S.C. 154(b) by 1239 days.

(21) Appl. No.: 14/208,804

(22) Filed: Mar. 13, 2014

(65) Prior Publication Data

US 2014/0271128 A1     Sep. 18, 2014

Related U.S. Application Data

(60) Provisional application No. 61/782,822, filed on Mar. 14, 2013.

(51) Int. Cl.

| *F01D 3/04* | (2006.01) |
|---|---|
| *F01D 25/18* | (2006.01) |
| *F16C 33/10* | (2006.01) |
| *F16C 27/02* | (2006.01) |
| *F16C 17/02* | (2006.01) |

(52) U.S. Cl.
CPC ............ *F01D 25/186* (2013.01); *F16C 27/02* (2013.01); *F16C 33/1045* (2013.01); *F05D 2220/40* (2013.01); *F16C 17/02* (2013.01); *F16C 2360/24* (2013.01)

(58) Field of Classification Search
CPC .......... F01D 3/04; F01D 25/186; F01D 25/22; F01D 25/20; F01D 25/18; F04D 29/047
USPC ......................................................... 415/107
See application file for complete search history.

(56) References Cited

U.S. PATENT DOCUMENTS

| 4,268,229 A * | 5/1981 | Berg ...................... F01D 11/00 |
|---|---|---|
| | | 415/111 |
| 4,322,949 A * | 4/1982 | Byrne ..................... F02B 37/10 |
| | | 60/606 |
| 5,924,286 A * | 7/1999 | Kapich ................... F02B 37/10 |
| | | 123/565 |

(Continued)

OTHER PUBLICATIONS

Calvert, J.B., "Turbines," http://mysite.du.edu/~jcalvert/tech/fluids/turbine.htm, Feb. 11, 2010 (13 pages).

*Primary Examiner* — Jason Shanske
*Assistant Examiner* — Jason Mikus
(74) *Attorney, Agent, or Firm* — Brian J. Pangrle

(57) ABSTRACT

An assembly for a turbocharger can include a shaft and turbine wheel assembly and a component that has a rotational axis and that includes a through bore for receipt of the component by the shaft of the shaft and turbine wheel assembly where the component includes an inner surface and an outer surface and one or more passages that extend between the inner surface and the outer surface, where the one or more passages are shaped to exert force on the component responsive to flow of fluid in the one or more passages and where the force rotates the component about the rotational axis. Various other examples of devices, assemblies, systems, methods, etc., are also disclosed.

18 Claims, 10 Drawing Sheets

(56) References Cited

U.S. PATENT DOCUMENTS

2011/0176907 A1* 7/2011 Groves ................ F01D 25/166
                                                    415/1
2012/0014782 A1* 1/2012 Petitjean ................ F01D 25/14
                                                   415/170.1

* cited by examiner

TURBOCHARGER LUBRICANT TURBINE

RELATED APPLICATIONS

This application claims the benefit of and priority to a U.S. Provisional Patent Application having Ser. No. 61/782,822, filed 14 Mar. 2013, which is incorporated by reference herein.

TECHNICAL FIELD

Subject matter disclosed herein relates generally to turbomachinery for internal combustion engines.

BACKGROUND

A turbocharger includes a shaft and turbine wheel assembly (SWA) rotatably supported by a bearing or bearings, for example, disposed in a bore of a housing. A compressor wheel may be fitted to the SWA such that energy from exhaust of an internal combustion engine may be harnessed to rotate the compressor wheel to compress intake air for the internal combustion engine.

A turbocharger may receive lubricant such as oil for lubrication of various surfaces, for example, journal surfaces of the bearings that rotatably support the shaft. Various technologies, techniques, etc., described herein relate to components that may interact with a lubricant stream, jet, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
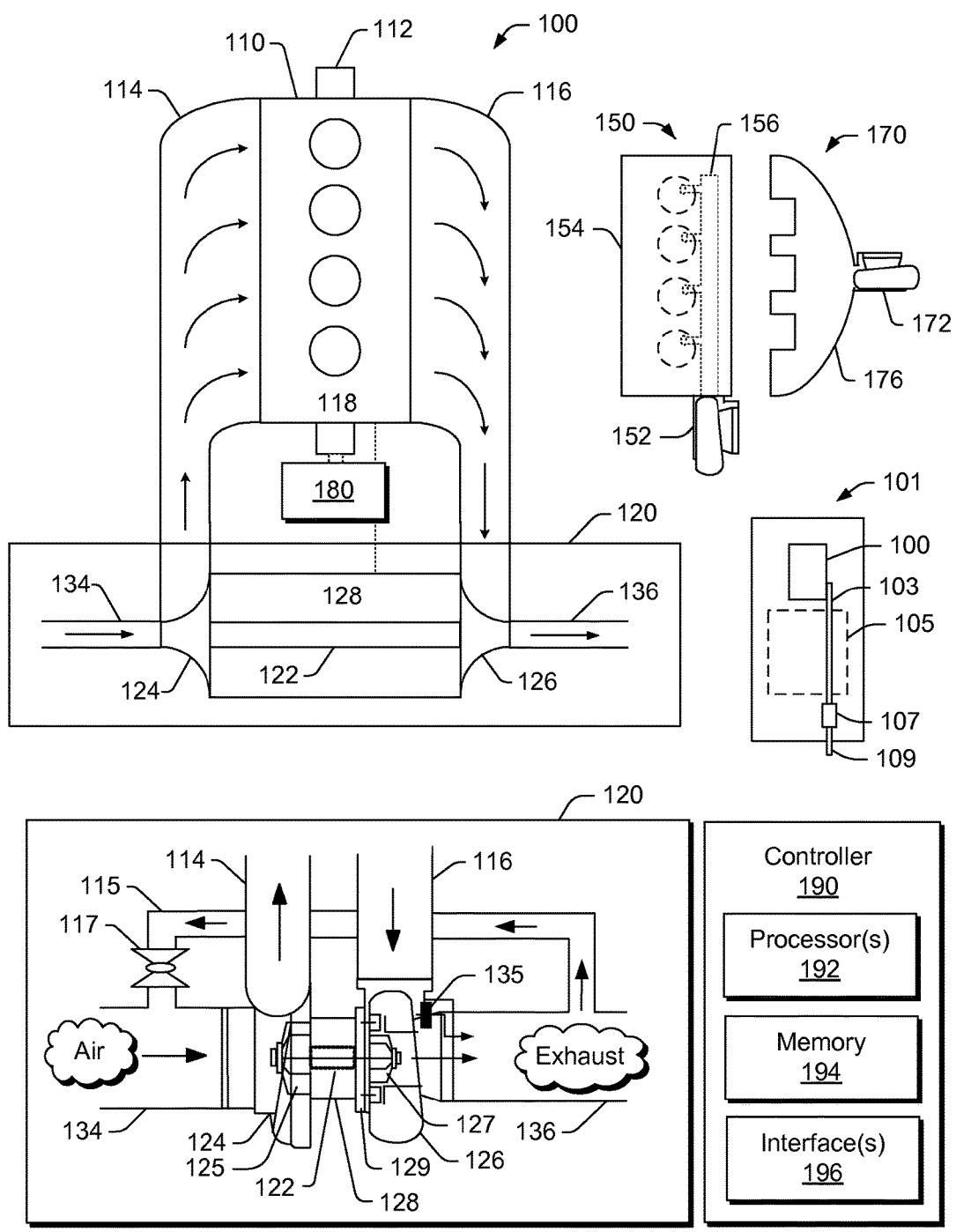
FIG. 1 is a series of diagrams of examples of a turbocharger, an internal combustion engine, and various equipment.

Turbochargers are frequently utilized to increase output of an internal combustion engine. Referring to FIG. 1, an example of a turbocharged system 100 includes an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

In the example of FIG. 1, the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136, which, for example, may be in fluid communication with the exhaust conduit 103 of the vehicle 101. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126 (e.g., upstream of the turbine wheel 127). The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping.

In the example arrangements 150 and 170, the turbine housing assemblies 152 and 172 may be configured for use with a wastegate, variable geometry assembly, etc.

FIG. 1 also shows a lubricant pump 180, which may be, for example, powered by the shaft 112 of the internal combustion engine 110 (e.g., directly or indirectly). As an example, a lubricant pump may be powered electrically, for example, via one or more batteries, an alternator, etc. As an example, a lubricant pump may be powered by one or more of a mechanical, electrical or other means.

As an example, the lubricant pump 180 may provide lubricant to the turbocharger 120, for example, via one or more conduits that connect to the housing assembly 128 of the turbocharger 120. As an example, the lubricant pump 180 (e.g., or other lubricant pump, lubricant flow valve, etc.) may be controllable by a control signal, for example, to control pressure, flow rate, etc. of lubricant. As an example, a system may include more than one lubricant pump. As an example, a system may include one or more lubricant flow control devices (e.g., controllable valves, controllable orifices, etc.).

In FIG. 1 an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, pressure, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, pressure, a variable geometry assembly (e.g., variable geometry compressor or turbine), a wastegate (e.g., via an actuator), an electric motor, or one or more other components associated with an engine, a turbocharger (or turbochargers), etc.

As an example, the controller 190 may include instructions stored in the memory 194 executable by at least one of the one or more processors 192 for controlling lubricant flow, for example, by controlling a lubricant pump that provides lubricant to a bore of a center housing of a turbocharger. For example, the controller 190 may control the lubricant pump 180 for purposes of controlling lubricant flow to the housing assembly 128 of the turbocharger 120.

As an example, a turbocharger fitted to an internal combustion engine of a road vehicle may experience various types of transient conditions. For example, consider a vehicle that is at an ambient temperature, which may possibly be about 0 C or less. In such a scenario, lubricant may be quite viscous and present some resistance to rotation of a turbocharger shaft supported by one or more bearings. Further, upon start of the internal combustion engine, engine speed may be quite low (e.g., idle rpm) and hence exhaust flow may be quite low as well. Such conditions may lead to poor transient response of the turbocharger, which, in turn, may detrimentally impact emissions (e.g., chemical, particulate, etc.) or other aspect of turbocharger operation, performance, longevity, etc. While an engine may gradually warm via combustion, friction, etc., some period of time can exist where performance is suboptimal. The foregoing scenario is one example of a type of transient conditions where performance may be suboptimal. Other types of transient conditions also exist where turbocharger shaft response may be suboptimal, which, in turn, may detrimentally impact performance (e.g., boost, emissions, longevity, etc.).

As an example, a turbocharger may include one or more lubricant turbines, for example, driven by lubricant pressure via a stream, jet or other flow. As an example, consider a reaction turbine where lubricant flows radially outwardly from one or more inlets to one or more outlets to cause the reaction turbine to rotate about a shaft of a turbocharger. As another example, consider a turbine wheel styled as a Francis turbine where lubricant may be directed to one or more vanes to cause the turbine wheel to rotate about a shaft of a turbocharger. As yet another example, consider an impulse turbine such as a Pelton turbine (e.g., a Pelton wheel) where lubricant may be directed to one or more "buckets" to cause the Pelton turbine to rotate about a shaft of a turbocharger.

As an example, lubricant may include potential energy (e.g., a pressure head) and kinetic energy (e.g., a velocity head). Various types of turbines may respond to such energy. For example, an impulse turbine may change the direction of flow of a lubricant jet where the resulting impulse spins the turbine and leaves the lubricant flow with diminished kinetic energy. In such an example, pressure drop may take place in a nozzle(s) such that the lubricant's pressure head is changed to velocity head by accelerating the lubricant with a nozzle(s). As an example, Newton's second law may describe transfer of energy for impulse turbines.

As an example, a reaction turbine may develop torque by reacting to lubricant pressure or mass. For example, pressure of lubricant may change as it passes through a reaction turbine's rotor blades. As an example, a pressure casement may be provided to contain the lubricant as it acts on the turbine stage or, for example, the turbine may be immersed in the lubricant flow (e.g., consider a wind turbine). As an example, a rotary reaction turbine may "contain" fluid via passages, for example, as in a rotary lawn sprinkler. As an example, a casing may act to contain and direct lubricant. As an example, Newton's third law may describe transfer of energy for reaction turbines.

As to a Pelton turbine, one or more nozzles may direct lubricant against a series of buckets mounted about a hub. In such an example, as lubricant flows into a bucket, the direction of the lubricant velocity changes to follow the contour of the bucket. When a lubricant-jet contacts the bucket, the lubricant exerts pressure on the bucket and the lubricant is decelerated as it does a "u-turn" and flows out the other side of the bucket at lower velocity. In the process, the lubricant's momentum is transferred to the turbine. As an example, a turbine system may be designed such that the lubricant-jet velocity is twice the velocity of the bucket. As an example, two buckets may be mounted side-by-side, thus splitting the lubricant jet in half, which may act to balance side-load forces and ensure smoother, efficient momentum transfer of the lubricant to the turbine wheel.

As an example, lubricant may be provided to a lubricant turbine in a turbocharger. In such an example, where lubricant pressure depends on engine speed, as engine speed increases, lubricant pressure may increase as well (e.g., "ramp up". Pressurized lubricant can be used to provide some initial amount of torque that may act to overcome some SWA inertia, resistance, etc., and provide a low end boost to a SWA.

Figure 2:
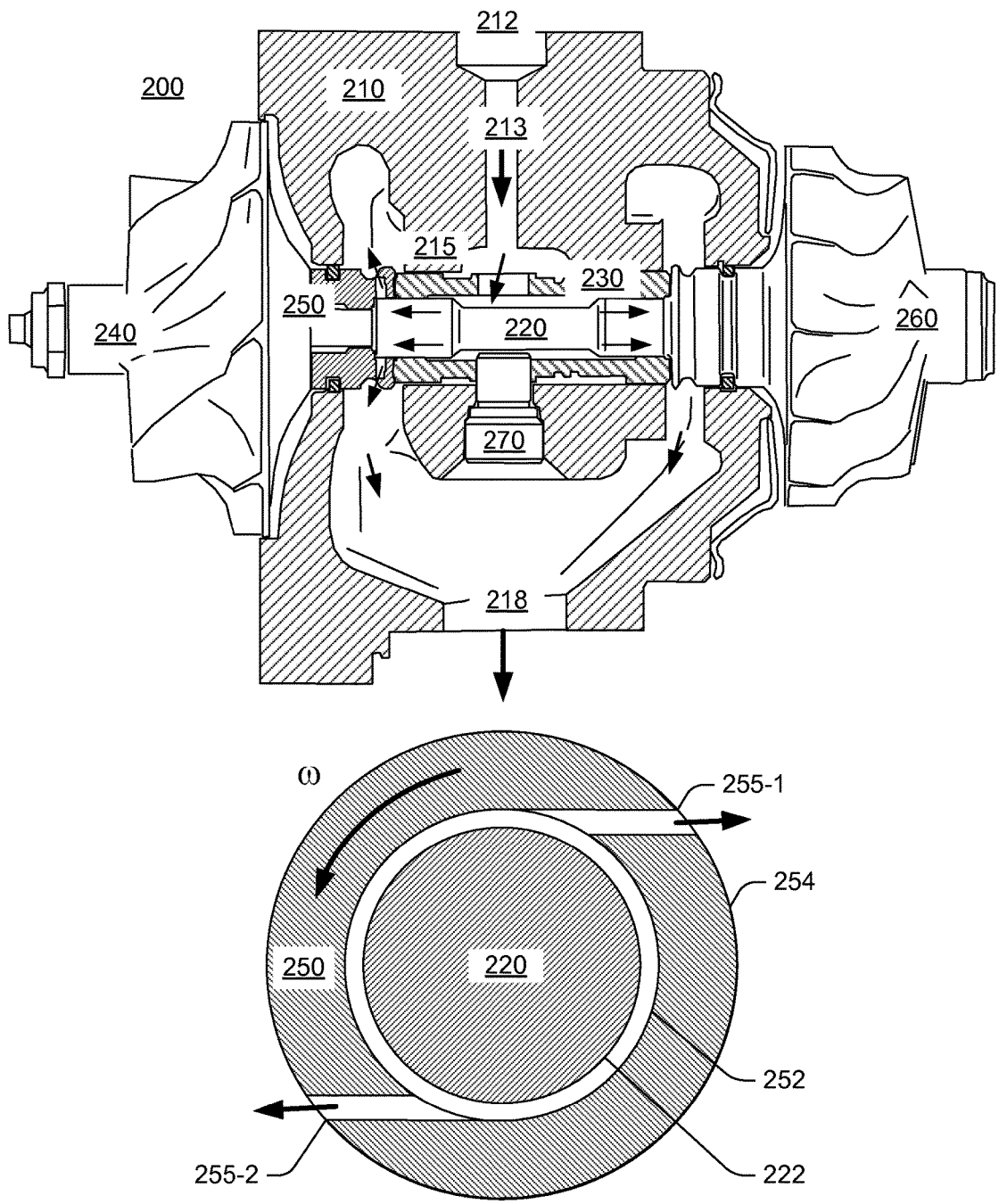
FIG. 2 is a series of diagrams of an example of an assembly that includes an example of a lubricant turbine.

FIG. 2 shows an example of an assembly 200 that includes a housing 210 with a lubricant inlet 212, a lubricant passage 213 from the inlet 212 to a bore 215 and a lubricant exit 218. The assembly 200 also includes a compressor wheel 240 and a turbine wheel 260, both operatively coupled to a shaft 220 that is rotatably supported by a bearing 230 disposed in the bore 215 of the housing 210. In the example of FIG. 2, a pin 270 is received by an opening to the bore 215 of the housing 210 and an opening in the bearing 230, for example, to axially locate the bearing 230 in the bore 215 of the housing 210.

As shown in the example of FIG. 2, the assembly 200 includes a lubricant turbine 250 disposed axially between the bearing 230 and the compressor wheel 240. The lubricant turbine 250 includes an inner surface 252 and an outer surface 254 where lubricant passages 255-1 and 255-2 extend therebetween. In such an example, pressurized lubricant may be received by the passages 255-1 and 255-2 at the inner surface 252 of the lubricant turbine 250 and pass radially outwardly to exit via the passages 255-1 and 255-2 at the outer surface 254 of the lubricant turbine 250. Accordingly, the lubricant turbine 250 may be a reaction turbine that rotates counter-clockwise about the shaft 220. In such an example, rotation of the lubricant turbine 250 may assist with rotation of the shaft 220, for example, by transfer of force to an outer surface 222 of the shaft 220 (e.g., coupled via a lubricant layer or film). As an example, the lubricant turbine 250 and the shaft 220 may be oriented to rotate in the same direction or, optionally, in opposite directions (e.g., depending on intended purpose of the lubricant turbine).

As an example, a lubricant turbine may also be a thrust member such as a thrust collar. For example, a thrust collar may include one or more features such that the thrust collar rotates responsive to flow of lubricant. As an example, such a thrust collar may be disposed at a compressor side or at a turbine side. As an example, an assembly may include a lubricant turbine at a compressor side and at a turbine side, for example, where one or both may be in the form of a thrust collar (see, e.g., the compressor side example of the lubricant turbine 250 in FIG. 2).

Figure 3:
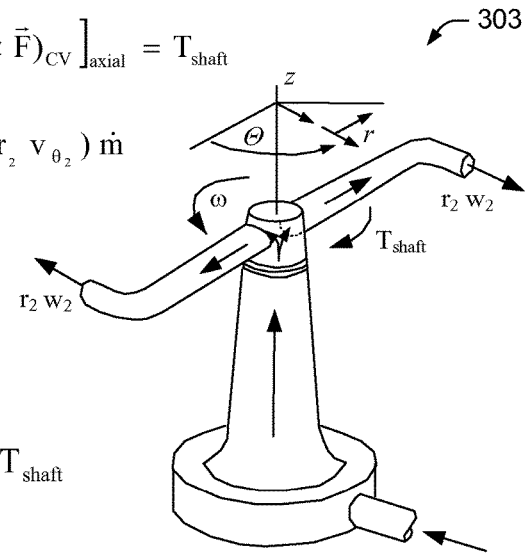
FIG. 3 is a series of diagrams of an example of a lubricant turbine and various vectors and equations associated with physics of a reaction turbine.
Figure 3:
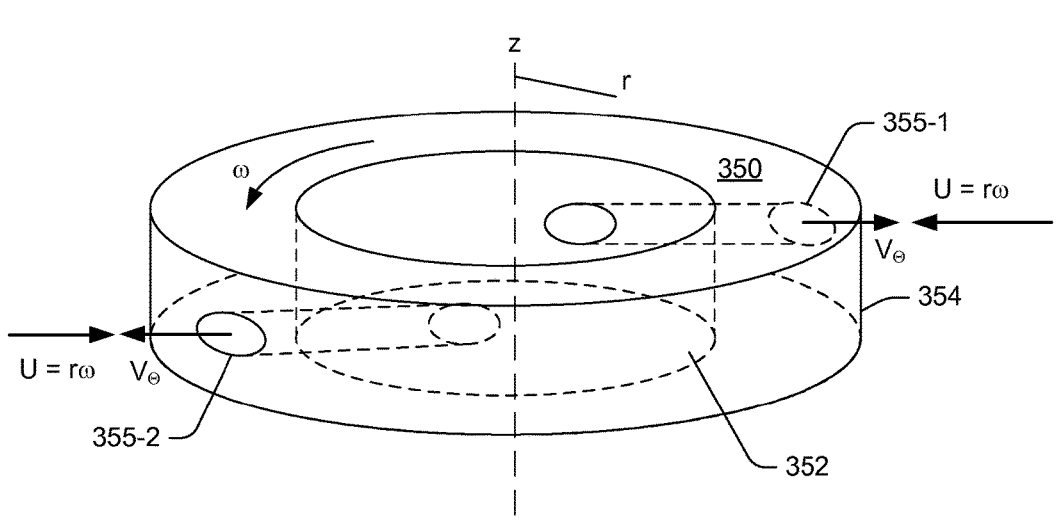

FIG. 3 shows examples of equations 301, an example of a rotary device 302 and an example of a lubricant turbine 350 as including a passage 355-1 and a passage 355-2 that extend between an inner surface 352 and an outer surface 354. In FIG. 3, various vectors as well as the equations 301 are shown for purposes of explaining physical phenomena. For example, the equations 301 may explain physical phenomena associated with the rotary device 303, which may be a rotary water sprinkler, and at least some of the equations may apply to explain physical phenomena associated with a lubricant turbine such as the lubricant turbine 350. As shown in FIG. 3, fluid enters the rotary device 303 at a base and travels upward along a z-axis to a shaft portion to which two conduits are coupled. The fluid flows via the shaft portion to the two conduits, which have respective openings disposed at a radial distance from the z-axis. As to the lubricant turbine 350, it may receive lubricant via one or more passages, clearances, etc. associated with a shaft where the lubricant can flow to the passages 355-1 and 355-2, each of which includes a respective opening disposed in the outer surface 354 of the lubricant turbine 350. In such an example, momentum flow from the openings (e.g., outlets) of the passages 355-1 and 355-2 of the lubricant turbine 350 can exert a force on the lubricant turbine 350 that causes torque to rotate the lubricant turbine 350 about the z-axis (e.g., shaft axis).

Applying the moment of momentum equation (top equation) to a fixed control volume, an equation may be derived for shaft torque, $T_{shaft}$. In the example of the rotary device 303, angular momentum at the inlet (e.g., point 1) may be assumed to be approximately zero because the vector cross product (e.g., with respect to r and velocity) and the axis of rotation are perpendicular. Given such an assumption, an expression for angular momentum of an outlet control surface may be formulated. An expression for absolute velocity, v, (e.g., as measured relative to a fixed control surface) may be formulated as well as an expression for a relative velocity, w, of a moving nozzle measured relative to the fixed control surface.

As to the example lubricant turbine 350, it may be received by a shaft and it may rotate at a different rotational speed than a shaft, for example, depending on coupling, clearances, etc. As an example, rotation of the lubricant turbine 350 can transfer force to a shaft. In such an example, where flow of lubricant may be controlled, the force transferred by a lubricant turbine to a shaft may be controlled.

Figure 4:
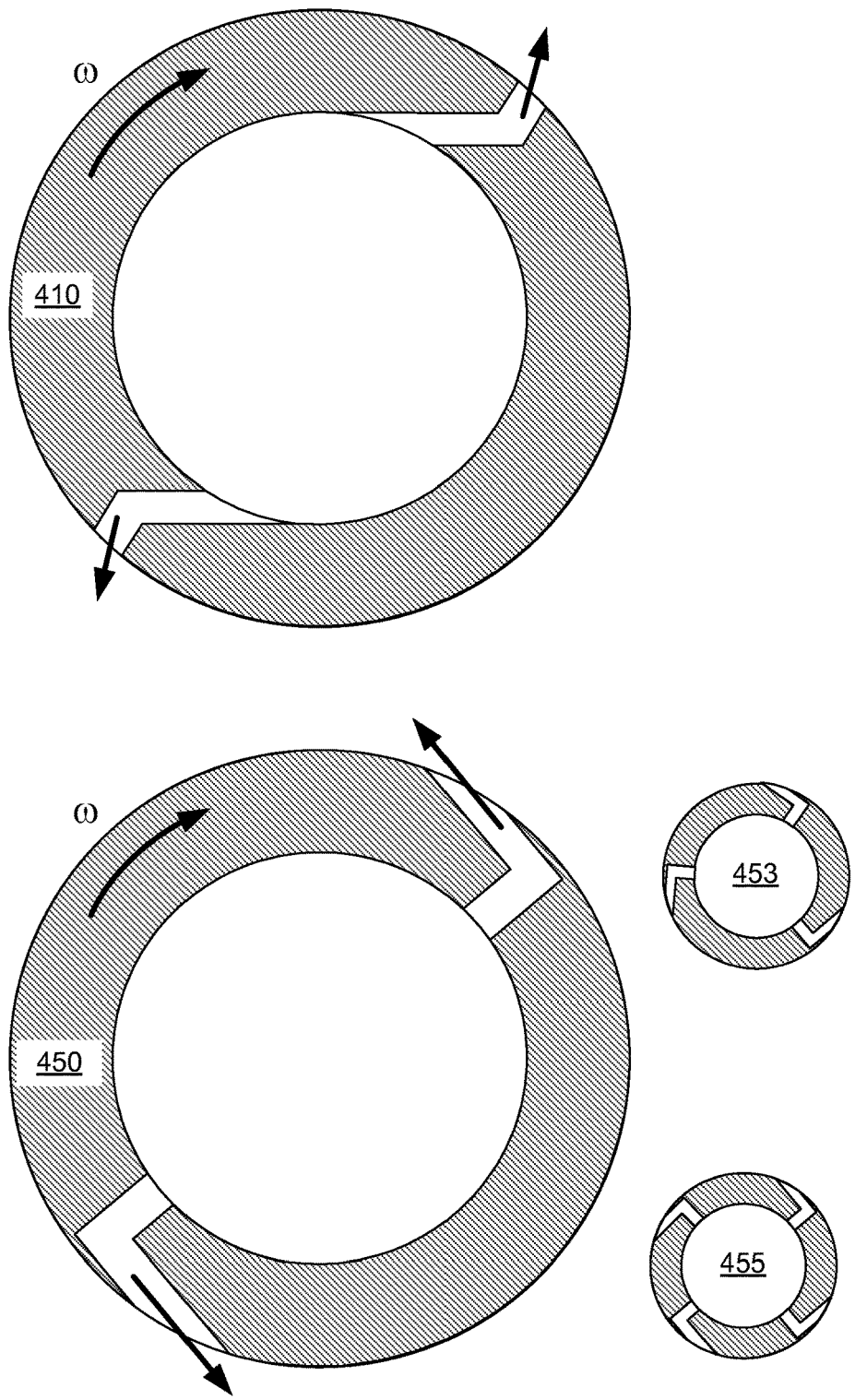
FIG. 4 is a series of diagrams of examples of lubricant turbines.

FIG. 4 shows examples of lubricant turbines 410, 450, 453 and 455. In the examples of FIG. 4, the rotation of the lubricant turbines 410, 450, 453 and 455 is in a clock-wise direction. As indicated, a lubricant turbine may include multiple lubricant passages, for example, two, three, four, etc.

Figure 5:
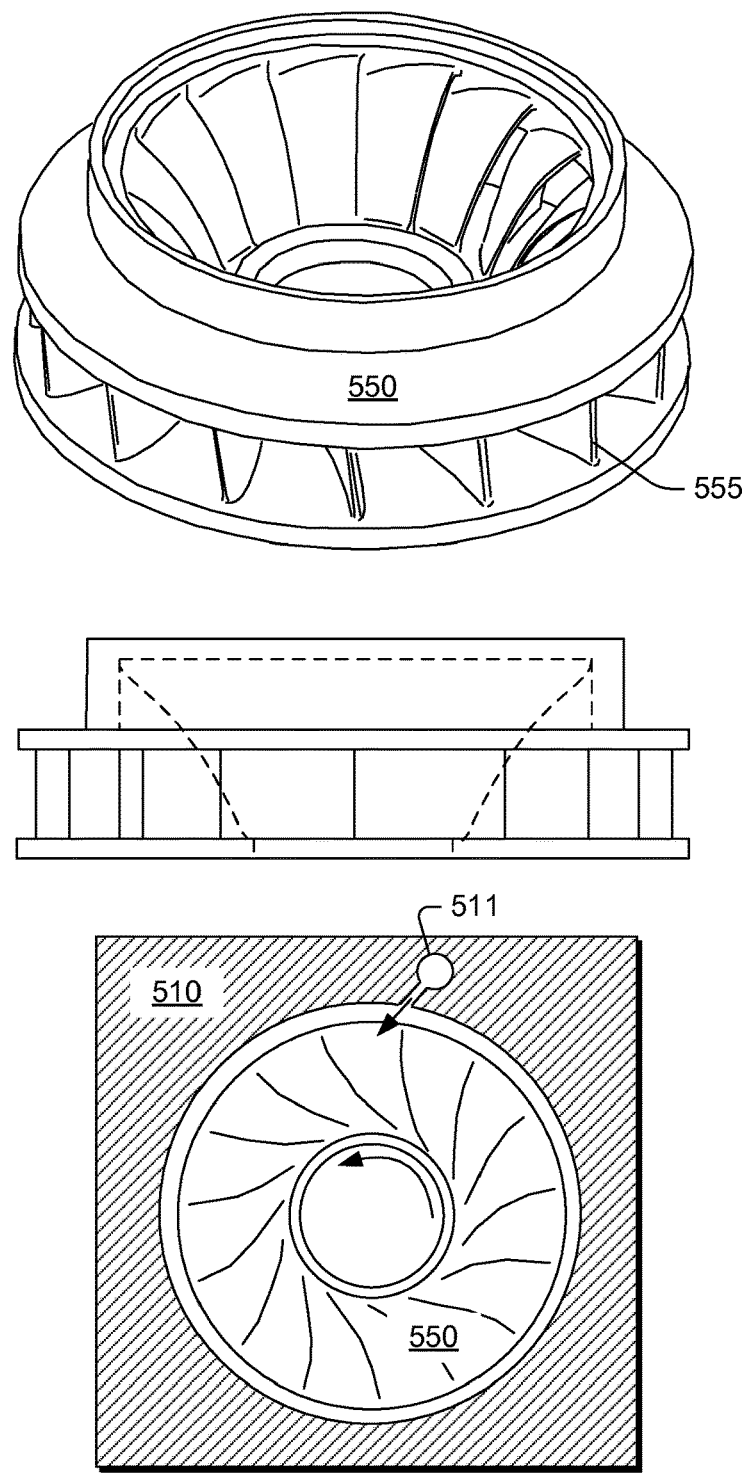
FIG. 5 is a series of diagrams of an example of a component and a housing.

FIG. 5 shows an example of a bladed component 550, which may be disposed in a housing 510 that includes a lubricant jet feature 511 (e.g., or features). In the example of FIG. 5, lubricant emitted by the lubricant jet feature 511 may be directed to blades 555 of the component 550 to thereby cause the component 550 to rotate, for example, about a shaft of a turbocharger (see, e.g., the shaft 220 of the assembly 200 of FIG. 2).

Figure 6:
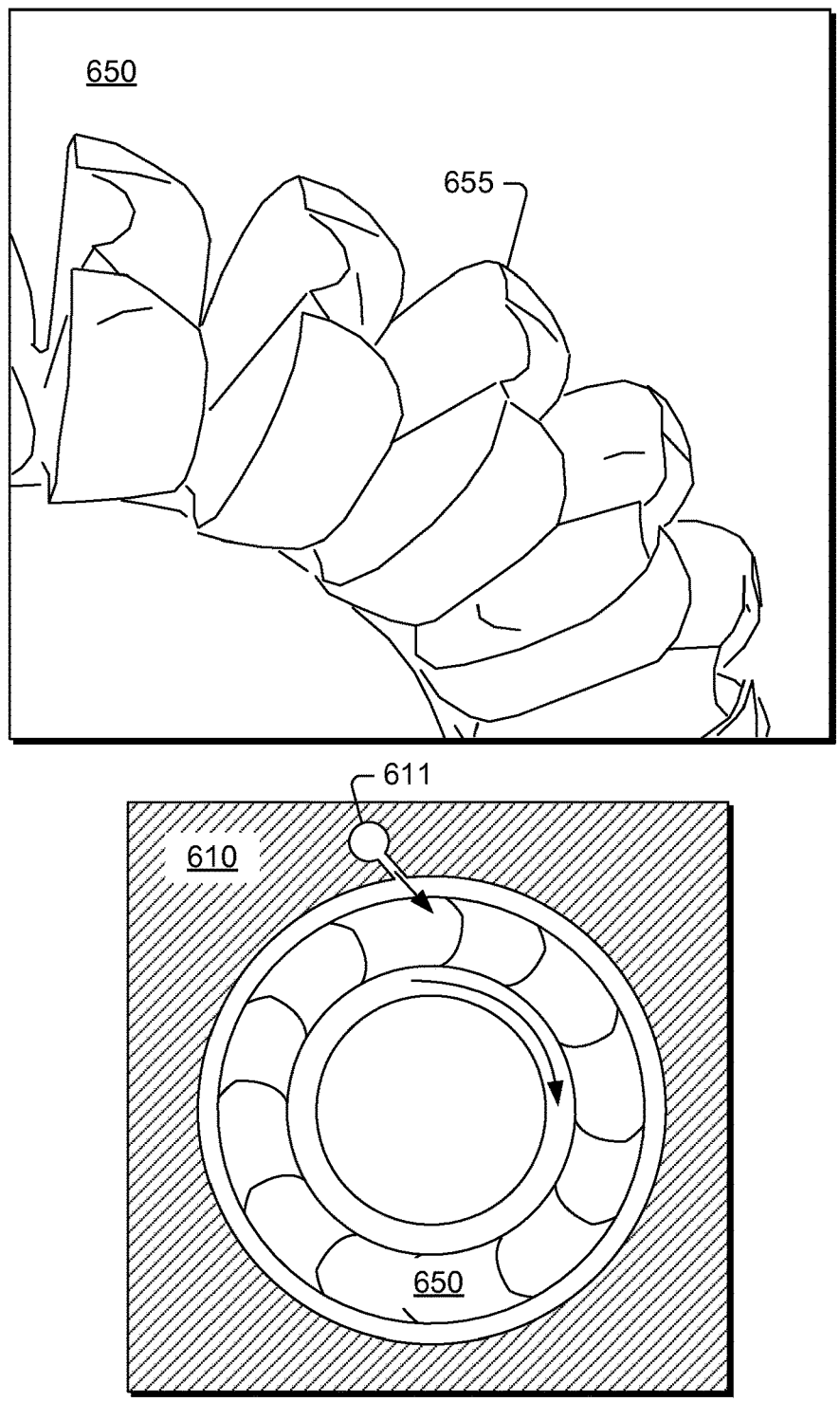
FIG. 6 is a series of diagrams of an example of a component and a housing.

FIG. 6 shows an example of a bucketed component 650, which may be disposed in a housing 610 that includes a lubricant jet feature 611 (e.g., or features). In the example of FIG. 6, lubricant emitted by the lubricant jet feature 611 may be directed to buckets 655 of the component 650 to thereby cause the component 650 to rotate, for example, about a shaft of a turbocharger (see, e.g., the shaft 220 of the assembly 200 of FIG. 2).

Figure 7:
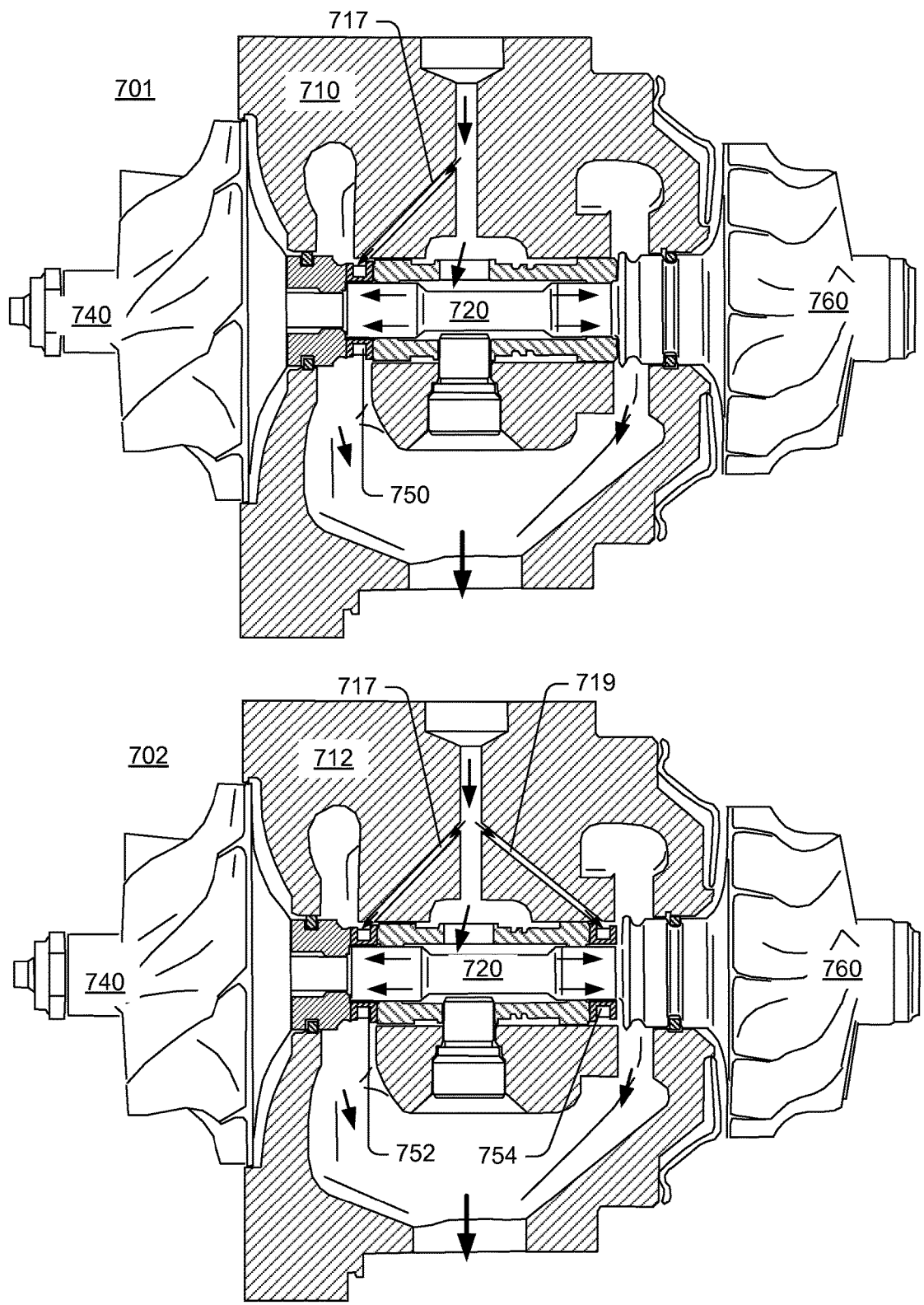
FIG. 7 is a series of diagrams of examples of assemblies.

FIG. 7 shows an example assembly 701 and an example assembly 702. As to the assembly 701, it includes a housing 710 with a lubricant passage 717 to provide lubricant to a component 750. As shown in the example of FIG. 7, the assembly 701 includes a shaft 720 operatively coupled to a compressor wheel 740 and a turbine wheel 760. In such an example, lubricant provided via the passage 717 may cause the component 750 to rotate about the shaft 720.

As to the assembly 702, it includes a housing 712 with a first lubricant passage 717 to provide lubricant to a first component 752 and a second lubricant passage 719 to provide lubricant to a second component 754. As shown in the example of FIG. 7, the assembly 702 includes a shaft 720 operatively coupled to a compressor wheel 740 and a turbine wheel 760. In such an example, lubricant provided via the first lubricant passage 717 may cause the first component 752 to rotate about the shaft 720 and lubricant provided via the second lubricant passage 719 may cause the second component 754 to rotate.

Figure 8:
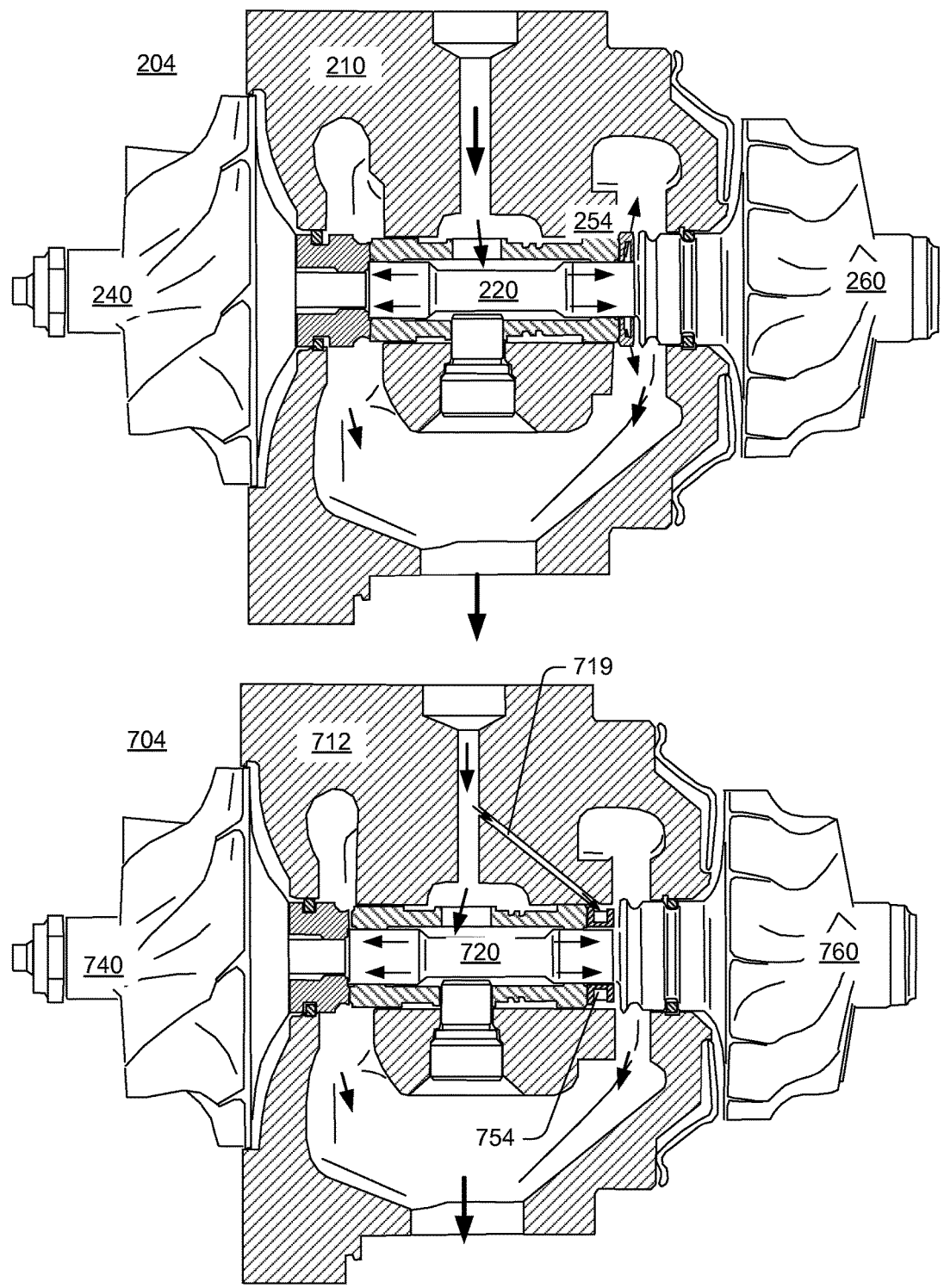
FIG. 8 is a series of diagrams of examples of assemblies.

FIG. 8 shows an example of an assembly 204 that includes a component 254 at a turbine side and an example of an assembly 704 that includes a component 754 at a turbine side. As described herein, an assembly may include one or more components (e.g., optionally one or more lubricant turbines), for example, at a compressor side, at a turbine side, at both compressor and turbine sides, at an intermediate position along a bore (e.g., as a spacer between two bearings, etc.).

Figure 9:
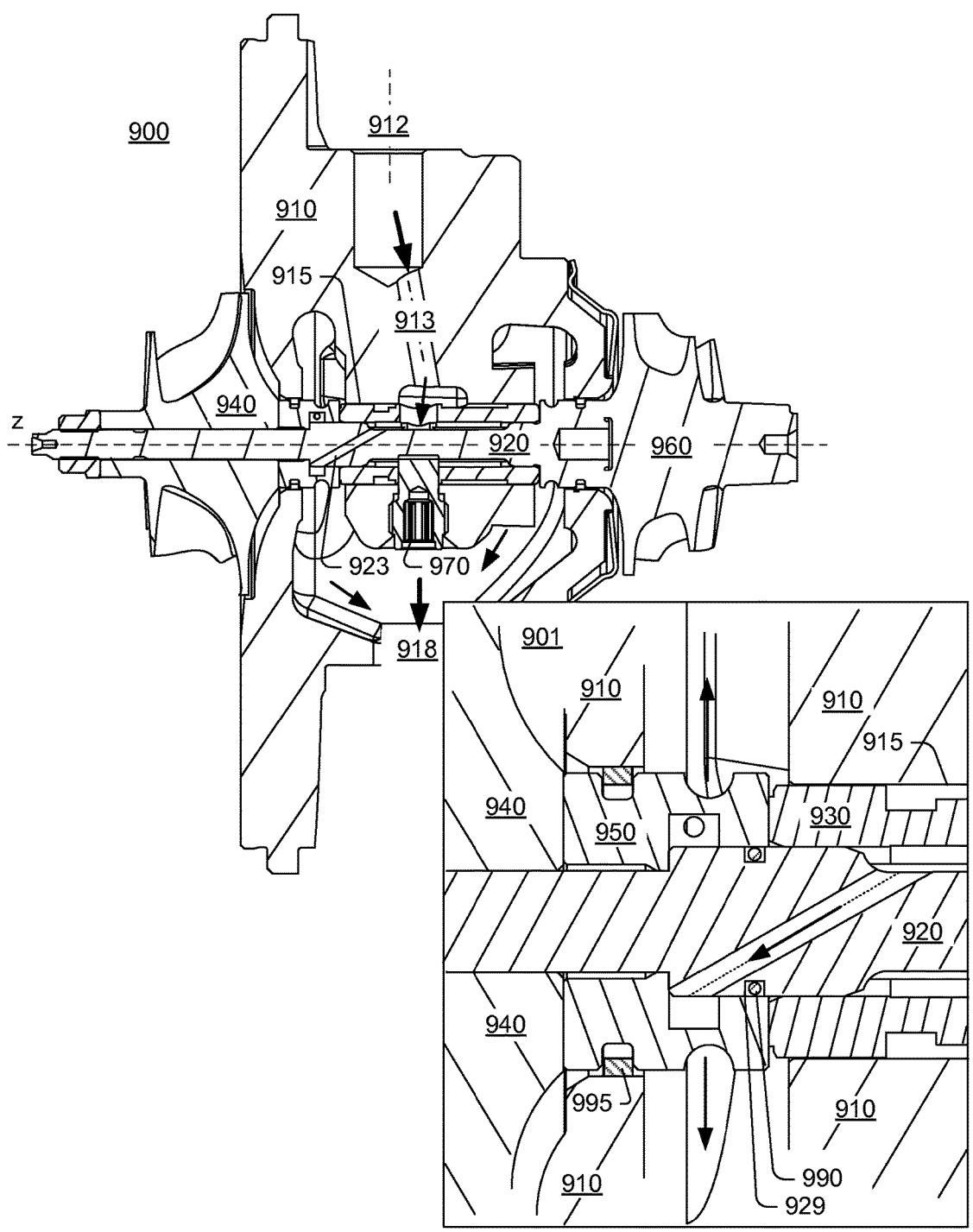
FIG. 9 is a series of diagrams of examples of assemblies.

FIG. 9 shows examples of assemblies 900 and 901 that include various features, including a shaft 920 with a passage 923 that is in fluid communication with a space (e.g., a chamber) defined in part by a rotatable component 950 that can disperse fluid communicated thereto via the passage 923. In the example assembly 901, FIG. 9 shows an example of an annular groove 929 that may seat a component 990 such as a seal, an o-ring, a piston ring, etc.

As shown in the example of FIG. 9, the assemblies 900 and 901 include a housing 910 that includes lubricant openings 912 and 918 and a lubricant passage 913 that is in fluid communication with the opening 912 and a bore 915 of the housing 910, for example, for flow of lubricant to a lubricant opening in a bearing 930 that is disposed at least partially in the bore 915 of the housing 910.

As shown, a shaft 920 may be part of a shaft and wheel assembly (SWA) that includes a turbine wheel 960, for example, that may be joined to the shaft 920 (e.g., via welding, etc.). As shown, the shaft 920 also includes a portion that extends from a compressor side of the housing 910 that can be coupled to a compressor wheel 940 (e.g., via a through bore or partial bore of a compressor wheel). A nut or other mechanism may fit to the shaft 920, for example, to secure the compressor wheel 940 to the shaft 920. During operation, where the turbine wheel 960 is disposed at least in part in a turbine housing for receipt of exhaust, exhaust may rotatably drive the turbine wheel 960 and hence the shaft 920 and compressor wheel 940, which may be disposed in a compressor housing that can receive intake air and communicate charged air (e.g., charged via rotation of the compressor wheel 940).

In the example of FIG. 9, a lubricant pump may pump lubricant into the housing 910 via the opening 912. Such a pump may be operable via one or more mechanisms. For example, consider an electrically driven pump that may be switched on/off, controlled as to pump flow rate, pump pressure, etc. As an example, a pump may be mechanically operated, for example, via a mechanism that operatively couples the pump to a drive shaft (e.g., directly or indirectly) of an internal combustion engine. As an example, a pump may include an electric mechanism and a mechanical mechanism.

As an example, a pump may pump lubricant into the housing 910 where the lubricant flows to the bore 915 of the housing 910 and to the shaft 920, for example, via the lubricant opening (e.g., or lubricant openings) in the bearing 930 (e.g., or other bearing assembly, etc.). As shown in the example of FIG. 9, the lubricant opening of the bearing 930 may be oriented to face an opening of the passage 913 of the housing 910.

In the example of FIG. 9, the bearing 930 is shown as being located (e.g., axially and azimuthally) in the bore 915 of the housing 910 via a locating pin 970. As shown, the locating pin 970 may fit into a locating pin opening of the bearing 930 with minimal clearance, for example, a clearance sufficient for movement of the bearing 930 in a semi-floating manner in a direction along a longitudinal axis of the locating pin 970 (e.g., radial movement of the bearing 930 in the bore 915 of the housing 910). Such a clearance may be sufficient for formation of a thin lubricating film yet be of such a dimension that it substantially restricts pressure driven flow of lubricant. For example, for a given lubricant pressure in a space defined between a portion of the shaft 920 (e.g., outer surface) and a portion of the bearing 930 (e.g., inner surface), lubricant may more readily flow toward the component 950 rather than toward the locating pin 970. Further, as shown, the bearing 930 includes a raised portion about the locating pin opening that receives the locating pin 970 where a region about that portion may be at a pressure that is approximately the same as the pressure supplied to the lubricant opening of the bearing 930 (e.g., consider a chamber formed between the an inner surface of the housing 910 and an outer surface of the bearing 930). Thus, a pressure driving force, if any, may be minimal as to flow of lubricant via a clearance between the locating pin 970 and the locating pin opening of the bearing 930.

As the turbine side of the bearing 930, a journal surface may form a clearance with an outer surface of the shaft 920 where the clearance is sufficient for lubrication of the shaft 920 with respect to the bearing 930. In such an example, a portion of lubricant supplied to the lubricant opening of the bearing 930 (e.g., a journal bearing) may flow to the turbine side clearance and outward, for example, radially, via a clearance formed between a shoulder of the shaft 920 (e.g., SWA) and an end of the bearing 930. In such an example, flow of lubricant toward the component 950 may be less restricted than toward the turbine wheel 960. Further, a clearance may exist between an outer surface of the shaft 920 and a compressor side journal surface of the bearing 930, for example, for lubrication of these surfaces as to rotation of the shaft 920 with respect to the bearing 930 (e.g., as axially and azimuthally located via the locating pin 970). As explained with respect to the turbine side clearance, the compressor side clearance may be more restrictive as to flow that one or more flow paths to the component 950 (e.g., for purposes of spinning the component 950).

In the example assemblies 900 and 901 of FIG. 9, as the opening 912 of the housing 910 may be supplied with lubricant at an inlet pressure that exceeds an outlet pressure at the opening 918 of the housing 910, lubricant may flow via the passage 923 of the shaft 920 and to an interior chamber defined at least in part by the component 950 (e.g., by an interior surface or surfaces) where at least one passage exists between the interior chamber and an exterior surface of the component 950. The shape of the at least one passage may, responsive to flow of lubricant therethrough, exert force upon the component 950 that causes the component 950 to rotate with respect to the housing 910 (e.g., consider rotation of the component 950 about the shaft 920). In such an example, lubricant flow may act to reduce transient response of a turbocharger that includes the assembly 900 or the assembly 901. As an example, such an effect may be controlled via control of lubricant pressure, lubricant flow rate, etc. to a chamber formed at least in part by the component 950.

As an example, a turbocharger may include a component that responds to lubricant flow in a manner that can decrease transient response (e.g., with respect to a turbocharger that does not include such a component, is not provided lubricant flow to such a component, etc.). As an example, an improvement in transient response may be of the order of a tenth of a second or more (e.g., consider an improvement of a quarter of a second or more). As an example, an improvement in transient response may include an increase in compressor discharge pressure (e.g., P2C), for example, by one percent or more. As an example, at low gas flow, a turbocharger that includes a component that responds to lubricant flow such as in the assembly 900 or the assembly 901 may perform with increased compressor efficiency compared to a turbocharger without such a component or where such a component is not supplied with pressurized lubricant, as explained. As an example, an increase in compressor efficiency at low gas flow of at least one point or more may be achieved (e.g., consider a two to three point improvement or more).

As an example, lubricant may be supplied to an assembly such as the assembly 900 or the assembly 901 of FIG. 9 where pressure of the supplied lubricant is sufficient to rotate a component such as the component 950 at a speed of the order of hundreds of revolutions per minute or more. As an example, where lubricant is supplied to an assembly such as the assembly 900 or the assembly 901 at a pressure of one bar or more, a component such as the component 950 may rotate at a speed of the order of thousands of revolutions per minute (e.g., consider a speed of several tens of thousands of rpm). As an example, an operational speed of a shaft of a turbocharger (e.g., as driven by exhaust) may exceed 100,000 rpm. As an example, a rotating assembly of a turbocharger may be balanced and lubricated for relatively free rotation responsive to force (e.g., consider a low coefficient of friction as to a rotatable assembly supported by one or more lubricant films). As an example, a component such as the component 950 of FIG. 9 may be supplied with lubricant and exert force to a rotating assembly (e.g., at least a portion thereof) in a manner that may reduce transient response of the rotating assembly (e.g., as part of an operational turbocharger). As an example, a lubricant turbine of a turbocharger may help to accelerate air fill rate to an internal combustion engine, which may also help to reduce transient responsive (e.g., to provide a quicker response).

Figure 10:
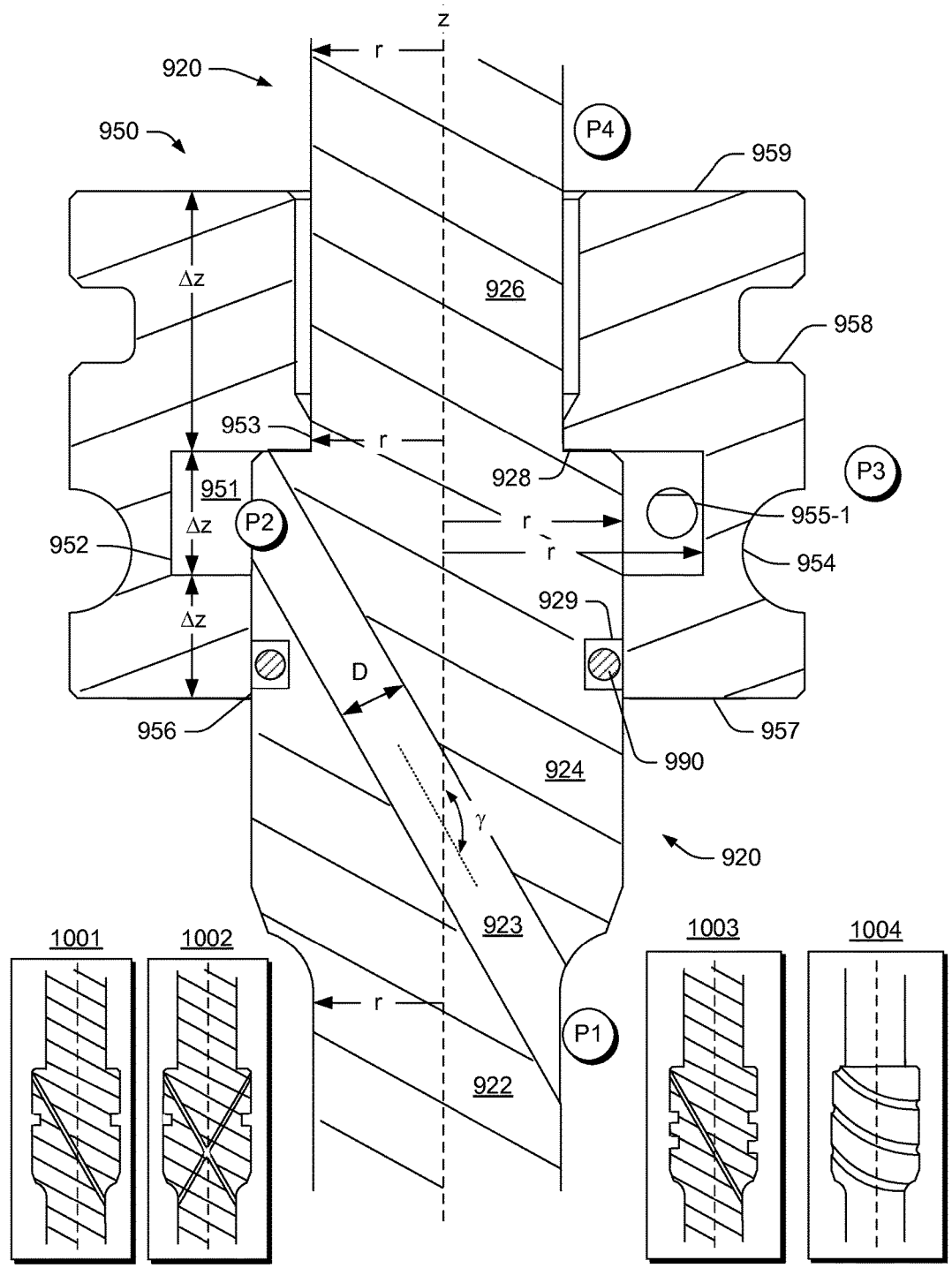
FIG. 10 is a series of diagrams of an example of an assembly and examples of shafts.

FIG. 10 shows a portion of the assembly 901 of FIG. 9 and examples of some additional arrangements of features 1001, 1002, 1003 and 1004. In FIG. 10, the shaft 920 and the component 950 are shown with respect to a z-axis and a radial direction r, for example, to illustrate various dimensions. For example, the component 950 is shown as including a chamber 951 that is defined in part by an axial dimension and a radial dimension of the component 950 as well as in part by a radial dimension of the shaft 920. In FIG. 10, the passage 923 of the shaft 920 is shown as including an opening that opens to the chamber 951 as well as an opening that does not open to the chamber, but rather, opens to a region where lubricant may be supplied at a pressure P1. In such an example, where the pressure P1 exceeds a pressure P2 of the chamber 951, lubricant may flow to the chamber 951.

As shown in FIG. 10, the chamber 951 includes a passage 955-1 (e.g., or passages 955-2, etc.) that opens to a region at a pressure P3. Where P3 is less than P2, lubricant may flow via the passage 955-1 (e.g., or passages 955-2, etc.), for example, in a manner that exerts a force on the component 950.

In FIG. 10, the component 950, which may be a lubricant turbine, is shown as including an inner surface 952, a neck 953, an outer surface 954, an inner surface 956, an outer face 957, an annular groove 958 and another outer face 959.

In the example of FIG. 10, the shaft 920 is shown as including a portion 922, a portion 924 and a portion 926 as well as a shoulder 928 and an annular groove 929 that may seat a component 990. As shown, the passage 923 extends at an angle γ with respect to the z-axis and includes a dimension D, which may be, for example, a diameter. The passage 923 includes an opening in the portion 922 of the shaft 920 and an opening in the portion 924 of the shaft 920. In the example of FIG. 10, the annular groove 929 is disposed in the portion 924 of the shaft and intermediate the openings of the passage 923. Upon receipt of the component 990, a seal may be formed that resists flow of lubricant from the chamber 951 of the component 950 (e.g., as arranged with respect to the shaft 920). As an example, the component 950 may include an annular groove that is configured to receive a component such as the component 990. In such an example, a shaft may or may not include an annular groove such as the groove 929.

In the example of FIG. 10, the neck 953 of the component 950 cooperates with the shoulder 928 of the shaft 920. The shoulder 928 and the neck 953 may act to restrict flow from the chamber 951 to a region about the portion 926 of the shaft 920. In such a manner, lubricant flowing to the chamber 951 via one or more clearances, passages, etc. associated with the shaft 920 may flow via the passage 955-1 (e.g., and one or more additional passages 955-2, etc.).

As to the example arrangements 1001, 1002, 1003 and 1004 of FIG. 10, the arrangement 1001 illustrates a shaft with a smaller dimensioned passage, the arrangement 1002 illustrates a shaft with a plurality of passages, the arrangement 1003 illustrates a shaft with a plurality of annular grooves and the arrangement 1004 illustrates a shaft with a spiral groove that extends over an axial distance of the shaft, which may be a lubricant passage. As an example, an assembly may include one or more of the features illustrated in FIG. 10.

While various examples are described with respect to a particular direction of rotation of a lubricant turbine, the direction of rotation may be selected based on desired results. For example, in some situations, a direction of rotation opposite to that of a SWA, rotating assembly, etc. may be desirable; whereas, in some situations, a direction of rotation of a SWA, rotating assembly, etc. may be desirable.

As an example, an turbocharger may include features of the assembly 200, the assembly 204, the assembly 701, the assembly 702, the assembly 704, the assembly 900, the assembly 901 and/or any one or more features of the examples of lubricant turbines described herein.

As an example, an assembly may include a lubricant pump to supply lubricant directly or indirectly to one or more lubricant turbines. For example, a lubricant pump may include an electric motor that is controlled by a controller. In such an example, the controller may activate the electric motor and hence the pump during a transient or expected transient, for example, to cause a lubricant turbine or lubricant turbines to rotate. As an example, one or more valves, passages, conduits, etc. may be provided to communicate lubricant to a lubricant turbine or lubricant turbines.

As an example, a lubricant turbine may operate as a reaction turbine, an impulse turbine or a hybrid reaction/impulse turbine. As to the latter, consider a lubricant turbine that includes passages such as the passages 255-1 and 255-2 of the lubricant turbine 250 of FIG. 2 and that includes one or more buckets such as the buckets 655 of the lubricant turbine 650 of FIG. 6. In such an example, the buckets and the passages may provide for rotation of the lubricant turbine in the same direction or in opposite directions. For example, rotational direction of such a lubricant turbine may be determined by comparing energy directed to impulse features and energy directed to reaction features. As another example, rotational speed may vary during operation as one or more sources of energy change. For example, an initial source of energy may be via a lubricant jet to an impulse feature while a latter source of energy may be via lubricant pressure supplied to a reaction feature. In such an example, the direction of rotation caused by such energies may be in the same direction or in opposite directions. As an example, a lubricant pump may be provided as part of an assembly to act as a source of energy for lubricant supplied to (e.g., directed to) one or more lubricant turbines.

As an example, an assembly for a turbocharger can include a shaft and turbine wheel assembly and a component that has a rotational axis and that includes a through bore for receipt of the component by the shaft of the shaft and turbine wheel assembly where the component includes an inner surface and an outer surface and one or more passages that extend between the inner surface and the outer surface, where the one or more passages are shaped to exert force on the component responsive to flow of fluid in the one or more passages and where the force rotates the component about the rotational axis. In such an example, the component may be a lubricant turbine and may optionally be a thrust collar and lubricant turbine.

As an example, a shaft of a shaft and turbine wheel assembly may include a lubricant passage. As an example, a shaft of a shaft and turbine wheel assembly may include an annular groove and a seal component disposed in the annular groove that can form a seal, for example, with respect to an inner surface of a component as received by the shaft of the shaft and wheel assembly.

As an example, a lubricant chamber may be formed in part by an inner surface of a component and in part by an outer surface of a shaft of a shaft and wheel assembly where the component is received by the shaft of the shaft and wheel assembly. As an example, a bore of a component may include a neck and a shaft of a shaft and wheel assembly may include a shoulder that seats in the bore adjacent to the neck (e.g., to restrict flow of lubricant from a lubricant chamber).

As an example, a turbocharger can include a housing that includes a bore; a bearing disposed in the bore; a shaft and turbine wheel assembly rotatably supported by the bearing; and a lubricant turbine disposed about the shaft of the shaft and turbine wheel assembly. In such an example, the lubricant turbine can have a rotational axis and can include a through bore for receipt of the lubricant by the shaft of the shaft and turbine wheel assembly where the lubricant turbine includes an inner surface and an outer surface and one or more passages that extend between the inner surface and the outer surface, where the one or more passages are shaped to exert force on the lubricant turbine responsive to flow of fluid in the one or more passages and where the force rotates the lubricant turbine about the rotational axis of the shaft and turbine wheel assembly. In such an example, the shaft of the shaft and turbine wheel assembly can include a lubricant passage.

As an example, a lubricant chamber may be formed in part by an inner surface of a lubricant turbine and in part by an outer surface of a shaft of a shaft and wheel assembly where the lubricant turbine is received by the shaft of the shaft and wheel assembly. As an example, a bore of a lubricant turbine may include a neck and a shaft of a shaft and wheel assembly may include a shoulder that seats in the bore adjacent to the neck.

As an example, a system can include a turbocharger that includes a housing that includes a bore, a bearing disposed in the bore, a shaft and turbine wheel assembly rotatably supported by the bearing, and a lubricant turbine disposed about the shaft of the shaft and turbine wheel assembly; and a lubricant pump. In such an example, the system may include a controller that controls the lubricant pump. For example, a controller may include control logic that receives sensor input and that determines control output to control the lubricant pump to supply lubricant to the turbocharger. In such an example, the control logic may determine the control output based on detection of a transient condition via received sensor input.

As an example, a system may include a controller that includes control logic that issues a signal that controls a lubricant pump to supply a lubricant pressure that drives a lubricant turbine that reduces transient response of a turbocharger. As an example, a controller may include instructions stored in memory (e.g., a memory device) executable by at least one of one or more processors, for example, for controlling lubricant flow (e.g., by controlling a lubricant pump that provides lubricant to a bore of a housing of a turbocharger).

CONCLUSION

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly for a turbocharger, the assembly comprising:
   a shaft and turbine wheel assembly; and
   a component that has a rotational axis and that comprises a through bore for receipt of the component by the shaft of the shaft and turbine wheel assembly wherein the component comprises an inner surface that defines one or more fluid inlets, an outer surface that defines one or more fluid outlets and one or more passages that extend between the inner surface and the outer surface, wherein the one or more passages are shaped to exert force on the component responsive to flow of fluid radially outwardly in the one or more passages from the one or more fluid inlets to the one or more fluid outlets and wherein the force rotates the component about the rotational axis.

2. The assembly of claim 1 wherein the shaft of the shaft and turbine wheel assembly comprises a lubricant passage in fluid communication with the one or more fluid inlets of the component.

3. The assembly of claim 1 wherein the shaft of the shaft and turbine wheel assembly comprises an annular groove and a seal component disposed in the annular groove that forms a seal with respect to the inner surface of the component as received by the shaft of the shaft and wheel assembly.

4. The assembly of claim 1 wherein the component is in the form of a thrust collar.

5. The assembly of claim 1 wherein a lubricant chamber is in fluid communication with the one or more fluid inlets of the component wherein the lubricant chamber is formed in part by the inner surface of the component and in part by an outer surface of the shaft of the shaft and wheel assembly wherein the component is received by the shaft of the shaft and wheel assembly.

6. The assembly of claim 1 wherein the bore of the component comprises a neck and wherein the shaft of the shaft and wheel assembly comprises a shoulder that seats in the bore adjacent to the neck.

7. A turbocharger comprising:
   a housing that comprises a bore;
   a bearing disposed in the bore;
   a shaft and turbine wheel assembly rotatably supported by the bearing;
   a lubricant turbine disposed about the shaft of the shaft and turbine wheel assembly wherein the lubricant turbine comprises one or more lubricant inlets at an inner surface and one or more corresponding lubricant outlets at an outer surface; and
   a lubricant supply passage, in fluid communication with the one or more lubricant inlets of the lubricant turbine, that supplies pressurized lubricant to the lubricant turbine that flows radially outwardly from the one or more lubricant inlets to the one or more corresponding lubricant outlets.

8. The turbocharger of claim 7 wherein the shaft of the shaft and turbine wheel assembly comprises at least a portion of the lubricant supply passage.

9. The turbocharger of claim 7 wherein the shaft of the shaft and turbine wheel assembly comprises an annular groove and a seal component disposed in the annular groove that forms a seal with respect to an inner surface of the lubricant turbine as received by the shaft of the shaft and wheel assembly.

10. The turbocharger of claim 7 wherein the lubricant turbine is in the form of a thrust collar.

11. The turbocharger of claim 7 wherein a lubricant chamber is formed in part by an inner surface of the lubricant turbine and in part by an outer surface of the shaft of the shaft and wheel assembly where the lubricant turbine is received by the shaft of the shaft and wheel assembly and wherein the lubricant supply passage is in fluid communication with the lubricant chamber.

12. The turbocharger of claim 7 wherein a bore of the lubricant turbine comprises a neck and wherein the shaft of the shaft and wheel assembly comprises a shoulder that seats in the bore adjacent to the neck.

13. The turbocharger of claim 7 comprising a locating pin that locates the bearing in the bore of the housing.

14. A system comprising:
a turbocharger that comprises a housing that comprises a bore, a bearing disposed in the bore, a shaft and turbine wheel assembly rotatably supported by the bearing, and a lubricant turbine disposed about the shaft of the shaft and turbine wheel assembly wherein the lubricant turbine comprises one or more lubricant inlets at an inner surface and one or more corresponding lubricant outlets at an outer surface; and
a lubricant pump that supplies pressurized lubricant to the lubricant turbine that flows radially outwardly from the one or more lubricant inlets to the one or more corresponding lubricant outlets.

15. The system of claim 14 comprising a controller that controls the lubricant pump.

16. The system of claim 15 wherein the controller comprises control logic that receives sensor input and that determines control output to control the lubricant pump to supply lubricant to the turbocharger.

17. The system of claim 16 wherein the control logic determines the control output based on detection of a transient condition via received sensor input.

18. The system of claim 15 wherein the controller comprises control logic that issues a signal that controls the lubricant pump to supply a lubricant pressure that drives the lubricant turbine that reduces transient response of the turbocharger.

* * * * *